(12) United States Patent
Marecki et al.

(10) Patent No.: US 8,793,211 B2
(45) Date of Patent: Jul. 29, 2014

(54) SYSTEM AND METHOD FOR SECURE INFORMATION SHARING WITH UNTRUSTED RECIPIENTS

(75) Inventors: Janusz Marecki, New York, NY (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 12/806,686

(22) Filed: Aug. 19, 2010

(65) Prior Publication Data

US 2012/0047103 A1 Feb. 23, 2012

(51) Int. Cl.
*G06F 15/00* (2006.01)
*G06F 15/18* (2006.01)

(52) U.S. Cl.
USPC .................................. 706/62; 726/7; 726/26

(58) Field of Classification Search
CPC ................................ G06F 21/31; G06F 21/10
USPC ........................................ 706/62; 726/7, 26
See application file for complete search history.

(56) References Cited

PUBLICATIONS

S. Buchegger and J.-Y. L. Boudec, "Self-Policing Mobile Ad Hoc Networks by Reputation Systems," Communications Magazine, IEEE, vol. 43, No. 7, pp. 101-107, 2005.*
P. Michiardi and R. Molva, "CORE: A Collaborative Reputation Mechanism to Enforce Node Cooperation in Mobile Ad Hoc Networks," IFIP TC6/TC11 6th Joint Working Conference on Communications and Multimedia Security, IFIP Conference Proceedings, vol. 228, Dec. 2001, pp. 1-14.*
Bell, "One-Switch Utility Functions and a Measure of Risk", Harvard Business School, Soldiers Field, Boston, MA 02163, 0025-19-9/88/3412/1416$01.25, pp. 1416-1424, 1988.
Bresina, et al., "Planning Under Continuous Time and Resource Uncertainty: A Challenge for AI", NASA Ames Research Center, Jan. 24, 2002, pp. 1-7.
Feng, et al., "Region-Based Incremental Pruning for POMDPs", UAI 2004, pp. 146-153.
Pineau, et al., "Point-based value iteration: An anytime algorithm for POMDPs" Carnegie Mellon University, Robotics Institute, 5000 Forbes Avenue, Pittsburgh, PA 15213, 2003.
Roy, et al., "Exponential Family PCA for Belief Compression in POMDPs" Advances in Neural Information Processing Systems 15, MIT Press (2003).
Spaan, et al., "Perseus: Randomized Point-based Value Iteration for POMDPs", Journal of Artificial Intelligence Research 24 (2005) pp. 195-220, submitted Nov. 2004; published Aug. 2005.

(Continued)

*Primary Examiner* — Kakali Chaki
*Assistant Examiner* — Vincent Gonzales
(74) *Attorney, Agent, or Firm* — Scully, Scott, Murphy & Presser, P.C.; Daniel P. Morris, Esq.

(57) ABSTRACT

System, method and computer program product for modelling information sharing domains as Partially Observable Markov Decision Processes (POMDP), and that provides solutions that view the information sharing as a sequential process where the trustworthiness of the information recipients is monitored using data leakage detection mechanisms. In one embodiment, the system, method and computer program product performs (i) formulating information sharing decisions using Partially Observable Markov Decision Processes combined with a digital watermarking leakage detection mechanism, and (ii) deriving optimal information sharing strategies for the sender and optimal information leakage strategies for a recipient as a function of the efficacy of the underlying monitoring mechanism. By employing POMDPs in information sharing domains, users (senders) can maximize the expected reward of their data/information sharing actions.

26 Claims, 11 Drawing Sheets

(56) References Cited

PUBLICATIONS

Smith, et al., "Point-Based POMDP Algorithms: Improved Analysis and Implementation", Robotics Institute, Carnegie Mellon University, Pittsburgh, PA 15213.

Sondik, "The Optimal Control of Partially Observable Markov Processes over the Infinite Horizon: Discounted Costs". Operations Research, vol. 26, No. 2, Mar.-Apr. 1978, pp. 282-304.

Varakantham, et al., "Towards Efficient Computation of Error Bounded Solutions in POMDPs: Expected Value Approximation and Dynamic Disjunctive Beliefs", IJCAI-07, pp. 2638-2643, 2007.

Hauskrecht, "Value-Function Approximations for Partially Observable Markov Decision Processes", Journal of Artificial Intelligence Research 13 (2000) 33-94, Submitted Sep. 1999; published Aug. 2000; pp. 33-94.

Liu, et al., "Functional Value Iteration for Decision-Theoretic Planning with General Utility Functions", Department of Computer Sciences, University of Texas at Austin, Austin, TX 78712-0233 and Computer Science Department, University of California, Los Angeles, CA 90089-0781, 2006.

Cheng et al., "Fuzzy Multi-Level Security: An Experiment on Quantified Risk-Adaptive Access Control," in Proceedings of the 2007 IEEE Symposium on Security and Privacy (SP 2007), May 20-23, 2007, pp. 222-230.

Jason Program Office, "Horizontal Integration: Broader Access Models for Realizing Information Dominance," MITRE Corporation, Special Report JSR-04-13, Dec. 2004.

Srivatsa et al., "Trust Management for Secure Information Flows," in Proceedings of 15th ACM Conference on Computer and Communication Security (CCS), Oct. 27-31, 2008.

Srivatsa et al., "Securing information flows: A metadata framework", in Proceedings of 1st IEEE Workshop on Quality of Information for Sensor Networks (QoISN), Sep. 29-Oct. 2, 2008.

Athanasiou et al., "Overcoming Misbehaviour in Mobile Ad Hoc Networks: An Overview," Crossroads The ACM Student Magazine, No. 114, pp. 23-30, 2005; last printed Dec. 10, 2007.

Poupart, et al., "VDCBPI: An approximate scalable algorithm for large scale POMDPs," in NIPS, vol. 17, Dec. 13-18, 2004, pp. 1081-1088.

Conti, et al., "Cooperation Issues in Mobile Ad Hoc Networks," in Proceedings of the 24th International Conference on Distributed Computing Systems Workshops (ICDCSW 2004), IEEE Computer Society, Mar. 23-24, 2004, pp. 803-808.

Reidt, et al., "The Fable of the Bees: Incentivizing Robust Revocation Decision Making in Ad-Hoc Networks," in Proceedings of 16th ACM Conference on Computer and Communication Security (CCS), Nov. 9-13, 2009.

Chan, et al., "Random Key Predistribution Schemes for Sensor Networks," in Proceedings of the 2003 IEEE Symposium on Security and Privacy (S&P 2003), IEEE Computer Society, May 2003, pp. 197-213.

Eschenauer, et al., "A Key-Management Scheme for Distributed Sensor Networks," in Proceedings of the 9th ACM conference on Computer and communications security (CCS 2002) Nov. 18-22, 2002.

\* cited by examiner

|  | DECISION EPOCH 1 | | DECISION EPOCH 2 | | DECISION EPOCH 3 | | DECISION EPOCH 4 |
|---|---|---|---|---|---|---|---|
|  | ACTION | OBSERVATION | ACTION | OBSERVATION | ACTION | OBSERVATION | ACTION |
| SCENARIO 1 | $a_{SHARE}$ | %NOLEAK | $a_{SHARE}$ | %NOLEAK | $a_{SHARE}$ | %NOLEAK | $a_{SHARE}$ |
| SCENARIO 2 | $a_{SHARE}$ | %NOLEAK | $a_{SHARE}$ | %NOLEAK | $a_{SHARE}$ | %LEAK | $a_{SHARE}$ |
| SCENARIO 3 | $a_{SHARE}$ | %NOLEAK | $a_{SHARE}$ | %LEAK | $a_{SHARE}$ | %NOLEAK | $a_{SHARE}$ |
| SCENARIO 4 | $a_{SHARE}$ | %NOLEAK | $a_{SHARE}$ | %LEAK | $a_{SHARE}$ | %LEAK | $a_{NOSHARE}$ |
| SCENARIO 5 | $a_{SHARE}$ | %LEAK | $a_{NOSHARE}$ | %0 | $a_{NOSHARE}$ | %0 | $a_{NOSHARE}$ |

TABLE I

FIG. 8

|  | DECISION EPOCH 1 | | DECISION EPOCH 2 | | DECISION EPOCH 3 | | DECISION EPOCH 4 |
|---|---|---|---|---|---|---|---|
|  | ACTION | OBSERVATION | ACTION | OBSERVATION | ACTION | OBSERVATION | ACTION |
| SCENARIO 1 | $a_{SHARE}$ | %NOLEAK | $a_{SHARE}$ | %NOLEAK | $a_{SHARE}$ | %NOLEAK | $a_{SHARE}$ |
| SCENARIO 2 | $a_{SHARE}$ | %NOLEAK | $a_{SHARE}$ | %NOLEAK | $a_{SHARE}$ | %LEAK | $a_{SHARE}$ |
| SCENARIO 3 | $a_{SHARE}$ | %NOLEAK | $a_{SHARE}$ | %LEAK | $a_{SHARE}$ | %NOLEAK | $a_{NOSHARE}$ |
| SCENARIO 4 | $a_{SHARE}$ | %NOLEAK | $a_{SHARE}$ | %LEAK | $a_{SHARE}$ | %LEAK | $a_{SHARE}$ |
| SCENARIO 5 | $a_{SHARE}$ | %LEAK | $a_{SHARE}$ | %NOLEAK | $a_{SHARE}$ | %NOLEAK | $a_{SHARE}$ |
| SCENARIO 6 | $a_{SHARE}$ | %LEAK | $a_{SHARE}$ | %NOLEAK | $a_{SHARE}$ | %LEAK | $a_{NOSHARE}$ |
| SCENARIO 7 | $a_{SHARE}$ | %LEAK | $a_{SHARE}$ | %LEAK | $a_{NOSHARE}$ | %0 | $a_{NOSHARE}$ |

TABLE II

FIG. 9

| | DECISION EPOCH 1 | | DECISION EPOCH 2 | | DECISION EPOCH 3 | | DECISION EPOCH 4 |
|---|---|---|---|---|---|---|---|
| | ACTION | OBSERVATION | ACTION | OBSERVATION | ACTION | OBSERVATION | ACTION |
| SCENARIO 1 | $\alpha_{SHARE}$ | $\%_{NOLEAK}$ | $\alpha_{SHARE(1)}$ | $\%_{NOLEAK}$ | $\alpha_{SHARE(1)}$ | $\%_{NOLEAK}$ | $\alpha_{SHARE(1)}$ |
| SCENARIO 2 | $\alpha_{SHARE}$ | $\%_{NOLEAK}$ | $\alpha_{SHARE(1)}$ | $\%_{NOLEAK}$ | $\alpha_{SHARE(1)}$ | $\%_{LEAK}$ | $\alpha_{SHARE(1)}$ |
| SCENARIO 3 | $\alpha_{SHARE}$ | $\%_{NOLEAK}$ | $\alpha_{SHARE(1)}$ | $\%_{LEAK}$ | $\alpha_{SHARE(2)}$ | $\%_{NOLEAK}$ | $\alpha_{SHARE(2)}$ |
| SCENARIO 4 | $\alpha_{SHARE}$ | $\%_{NOLEAK}$ | $\alpha_{SHARE(1)}$ | $\%_{LEAK}$ | $\alpha_{SHARE(2)}$ | $\%_{LEAK}$ | $\alpha_{NOSHARE}$ |
| SCENARIO 5 | $\alpha_{SHARE}$ | $\%_{LEAK}$ | $\alpha_{SHARE(2)}$ | $\%_{NOLEAK}$ | $\alpha_{SHARE(2)}$ | $\%_{NOLEAK}$ | $\alpha_{SHARE(2)}$ |
| SCENARIO 6 | $\alpha_{SHARE}$ | $\%_{LEAK}$ | $\alpha_{SHARE(2)}$ | $\%_{NOLEAK}$ | $\alpha_{SHARE(2)}$ | $\%_{LEAK}$ | $\alpha_{SHARE(2)}$ |
| SCENARIO 7 | $\alpha_{SHARE}$ | $\%_{LEAK}$ | $\alpha_{SHARE(2)}$ | $\%_{LEAK}$ | $\alpha_{NOSHARE}$ | $\%_0$ | $\alpha_{NOSHARE}$ |

TABLE III

FIG. 10

| NUMBER OF DECISION EPOCHS | 1 | 2 | 3 | 4 | 5 | 6 | 7 | 8 | 9 | 10 |
|---|---|---|---|---|---|---|---|---|---|---|
| CHANCE OF LEAK DETECTION | 0% | 0% | 70% | 50% | 40% | 30% | 30% | 30% | 20% | 20% |

TABLE IV

FIG. 11

| | NUMBER OF DECISION EPOCHS | | | | |
|---|---|---|---|---|---|
| | 2 | 4 | 6 | 8 | 10 |
| ONE RECIPIENT | | | | | |
| FUZZINESS = 2 | 37 | 21 | 78 | 57 | 82 |
| FUZZINESS = 3 | 86 | 49 | 293 | 94 | 38 |
| FUZZINESS = 4 | 75 | 40 | 41 | 71 | 45 |
| TWO RECIPIENTS | | | | | |
| FUZZINESS = 2 | 61 | 71 | 89 | 99 | 149 |
| FUZZINESS = 3 | 345 | 393 | 478 | 561 | 577 |
| FUZZINESS = 4 | 959 | 1045 | 1214 | 1397 | 1623 |
| THREE RECIPIENTS | | | | | |
| FUZZINESS = 2 | 371 | 456 | 860 | 1064 | 1365 |
| FUZZINESS = 3 | 3851 | 4965 | 6215 | 8487 | 11060 |
| FUZZINESS = 4 | 20815 | 25996 | 32748 | 48473 | 64447 |
| FOUR RECIPIENTS | | | | | |
| FUZZINESS = 2 | 2083 | 3230 | 6532 | 11429 | 16316 |
| FUZZINESS = 3 | 45560 | 69745 | 93792 | 156302 | 249792 |
| FIVE RECIPIENTS | | | | | |
| FUZZINESS = 2 | 11744 | 19982 | 47398 | 98674 | 156288 |
| FUZZINESS = 3 | 631660 | 1156397 | 1638620 | 3180314 | 4587189 |

TABLE V

FIG. 12

SYSTEM AND METHOD FOR SECURE INFORMATION SHARING WITH UNTRUSTED RECIPIENTS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract. No. W911NF-06-3-0001 awarded by the United States Army.

FIELD OF INVENTION

The present invention relates generally to information sharing, and particularly, to a system and method for enabling the sharing of information under uncertain environments.

BACKGROUND

In both the commercial and defense sectors a compelling need is emerging for rapid, yet secure, dissemination of information to the concerned actors. For example, in a commercial setting, the ability of multiple partners to come together, share sensitive business information and coordinate activities to rapidly respond to business opportunities is becoming a key driver for success. Similarly, in a military setting, traditional wars between armies of nation-states are being replaced by highly dynamic missions where teams of soldiers, strategists, logisticians, and support personnel, fight against elusive enemies that easily blend into the civilian population. Securely disseminating mission critical tactical intelligence to the pertinent people in a timely manner will be a critical factor in a mission's success.

Within a single organization, it is possible to allow sharing of information while managing the risk of information disclosure by appropriately labeling (or classifying) information with its secrecy characteristics and performing an in-depth security assessment of its systems and users to create controls necessary to protect information commensurate with its label. Such a security/risk assessment will typically comprise a number of stakeholders and be carried out in a number of stages, including: system characterization, threat and vulnerability identification, control analysis, likelihood determination and impact analysis. Subsequently, policies can be put in place that will permit information to be shared within different parts of the organizations, provided that the recipient has necessary controls in place to protect the information. However, such an approach may not be viable for information sharing across organizations as one organization will typically not permit another to perform a security assessment of its internal systems, controls and people. In dynamic settings, where systems and processes evolve rapidly and there are transient needs for sharing tactical, time-sensitive information across organizational boundaries, a new approach of securing information flows is required.

Recently, new approaches based on risk estimation and economic mechanisms have been proposed for enabling the sharing of information in uncertain environments [P.-C. Cheng and P. Rohatgi and C. Keser and P. A. Karger and G. M. Wagner and A. S. Reninger in a referenced entitled "Fuzzy Multi-Level Security: An Experiment on Quantified Risk-Adaptive Access Control," in Proceedings of the 2007 IEEE Symposium on Security and Privacy (SP 2007), 2007, pp. 222-230, Jason Program Office in a reference entitled "HORIZONTAL INTEGRATION: Broader Access Models for Realizing Information Dominance," MITRE Corporation, Special Report JSR-04-13, 2004, and, M. Srivatsa and D. Agrawal and S. Balfe in a reference entitled "Trust Management for Secure Information Flows," in Proceedings of 15th ACM Conference on Computer and Communication Security (CCS), 2008. These approaches are based on the idea that the sender constantly updates the estimate of the risk of information disclosure when providing information to a receiver based on the secrecy of the information to be divulged and the sender's estimate on the trustworthiness of the recipient. The sender then "charges" the recipient for this estimated risk. The recipient, in turn, can decide which type of information is most useful to him and "pay" (using its line of risk credit) only to access those pieces of information. However, past work is largely empirical in estimating the risk of information disclosure and in addition, it fails to holistically model the uncertainty in detecting information leakage.

As an alternative to economic mechanisms, in order to encourage behavioral conformity in ad-hoc groups one can also employ incentive mechanisms which have received a lot of attention in recent years. To date, the goal of such works has been to either reward "good" behavior, or punish "bad" behavior. In one conventional technique, for example, entities exchange tokens as a means of charging for/rewarding service usage/provision. Entities which behave correctly and forward packets are rewarded with additional tokens which, in turn, may be spent on forwarding their own packets. However, these approaches also fail to model the uncertainty in detecting good/bad behavior when making appropriate reward/punishment decisions.

There currently exists an increase in demand for solutions that allow for rapid yet secure sharing of information.

It would be highly desirable to provide a system and method that enables the generation of a decision theoretic model for securing such information flows by reducing the risk of data leakage.

SUMMARY

The present invention addresses the above-mentioned shortcomings of the prior art approaches by providing a system and method that is designed to make optimal information sharing decisions based on only partial or imperfect monitoring data.

The system and method is designed to make optimal information sharing decisions based on only partial or imperfect monitoring data, while ensuring that the efficacy of the decisions degrades gracefully with that of the monitoring mechanism.

The system and method addresses such planning problems in two steps: First, it provides a first a formulation of the complex information sharing problems discussed above by combining Partially Observable Markov Decision Processes (POMDPs) with digital watermarking, a monitoring mechanism for data leakage detection. Second, it derives the optimal information sharing strategies for the sender and the optimal information leakage strategies for a rational-malicious recipient as a function of the efficacy of the underlying monitoring mechanism. In addition, the disclosure also provides a mechanism for analyzing the thresholds on the efficacy of a monitoring system in order to encourage information sharing under imperfect monitoring conditions for various reward models.

In one aspect, there is provided a system method and computer program product for optimally sharing information from a sender to one or more recipients. The method comprises: receiving, at a processor device, a parameter information including: identifiers of one or more recipients to receive shared information sent by a sender entity, number of information sharing decision time intervals n where 0≤n<N, and, a reward value for successful sharing and a penalty value for detecting a leakage; and building, using the processor device, a model of a dynamic trustworthiness of each the one or more recipients as a Partially Observable-Markov Decision Process (POMDP), the POMDP model including an initial sender belief state of trustworthiness of each of the recipients; deriving based on the model, an optimal information sharing policy for sharing with the one or more recipients that maximizes an expected reward for the sender; sharing the information with the one or more recipients, and, updating said belief state of trustworthiness of each recipient in the POMPD model in each decision time interval n by:

a) monitoring a communications network, using a leakage detection device, for a leakage of the information shared with the one or more recipients;
b) observing or not any shared information leakage associated with a recipient;
c) computing, for the sender, based on the observing, a policy to share the information among the one or more recipients in a subsequent decision time interval; and,
d) sharing, according to the policy, the information among the one or more recipients in the subsequent time interval.

In a further aspect, there is provided a computer system for optimally sharing information from a sender to one or more recipients comprising:

a memory;
a processor in communications with the memory, wherein the system performs a method comprising:
  receiving, at a processor device, a parameter information including: identifiers of one or more recipients to receive shared information sent by a sender entity, number of information sharing decision time intervals n where 0≤n<N, and, a reward value for successful sharing and a penalty value for detecting a leakage; and
building, at the processor device, a model of a dynamic trustworthiness of each the one or more recipients as a Partially Observable-Markov Decision Process (POMPD), the POMPD model including an initial sender belief state of trustworthiness of each of the recipients;
deriving based on the model, an optimal information sharing policy for sharing with the one or more recipients that maximizes an expected reward for the sender;
sharing the information with the one or more recipients, and,
updating, in each decision time interval n, the belief state of trustworthiness of each recipient in the POMPD model by:
  a) monitoring a communications network, using a leakage detection device, for a leakage of the information shared with the one or more recipients;
  b) observing or not any shared information leakage associated with a recipient;
  c) computing, for the sender, based on the observing, a policy to share the information among the one or more recipients in a subsequent decision time interval; and,
  d) sharing, according to the policy, the information among the one or more recipients in the subsequent time interval.

A computer program product is provided for performing operations. The computer program product includes a storage medium readable by a processing circuit and storing instructions run by the processing circuit for running a method. The method is the same as listed above.

BRIEF DESCRIPTION OF THE DRAWINGS

The objects, features and advantages of the present invention will become apparent to one skilled in the art, in view of the following detailed description taken in combination with the attached drawings, in which:

FIG. 8 illustrates Table I providing an example optimal sender policy for an information sharing domain with one deterministic recipient;

FIG. 9 illustrates Table II providing an example optimal sender policy for an information sharing domain with one fuzzy recipient;

FIG. 10 illustrates Table III providing an example optimal sender policy for an information sharing domain with multiple recipients;

FIG. 11 illustrates Table IV providing an example optimal recipient strategy (a chance with which the recipient allows the sender to detect a leak);

FIG. 12 illustrates Table V providing example run times (in milliseconds) for a POMDP solver employed to find optimal sender policies in an example implementation;

DETAILED DESCRIPTION

There is provided a decision theoretic approach for securing such information flows by reducing the risk of data leakage. The approach makes optimal information sharing decisions based on only partial or imperfect monitoring data, while ensuring that the efficacy of the decisions degrades gracefully with that of the monitoring mechanism.

The approach is applicable to information sharing domains that involve one information source (sender) and K information sinks (recipients) under the following generalized settings: (i) Information sharing occurs over a fixed period of N decision epochs and is mutually beneficial for the sender and each of the recipients; (ii) In each decision epoch a sender can share only one information object (e.g., packet), with a chosen recipient (i.e., it is understood that that the packets to be shared can be arranged in a serial order. By considering multiple copies of a packet, situations are modeled where a packet is to be shared with multiple recipients.); (iii) Leaking a shared packet results in a positive reward for the recipient and a penalty to the sender; (iv) Sharing a packet is instantaneous and the recipient leaks (or not) a packet immediately upon receiving it; (v) Sender uses a monitoring mechanism (e.g., digital watermark detector) to detect an (un)intended packet leakage by the recipients, and finally (vi) Subsequent sender actions (whether to share a packet and with whom) are determined using the imperfect observations made in (v).

It is understood that, without the existence of a monitoring mechanism or if an arbitrarily imperfect monitoring mechanism is used, then the system can have two trivial solutions: (a) share everything if the reward for information sharing is more than the penalty of information leakage; and (b) share nothing otherwise. In one embodiment, settings may be examined to encourage information sharing even when the penalty for information leakage is higher than that of information sharing by using a monitoring mechanism with realistic imperfections. In arriving at solutions to such planning problems, there is provided: a first of a kind formulation of the complex information sharing problems discussed above by combining Partially Observable Markov Decision Processes (POMDPs) with digital watermarking, one type of monitoring mechanism for data leakage detection. Second, the optimal information sharing strategies for the sender and the optimal information leakage strategies for a rational-malicious recipient as a function of the efficacy of the underlying monitoring mechanism are derived. Finally, the thresholds on the efficacy of a monitoring system are analyzed in order to encourage information sharing under imperfect monitoring conditions for various reward models.

Figure 1:
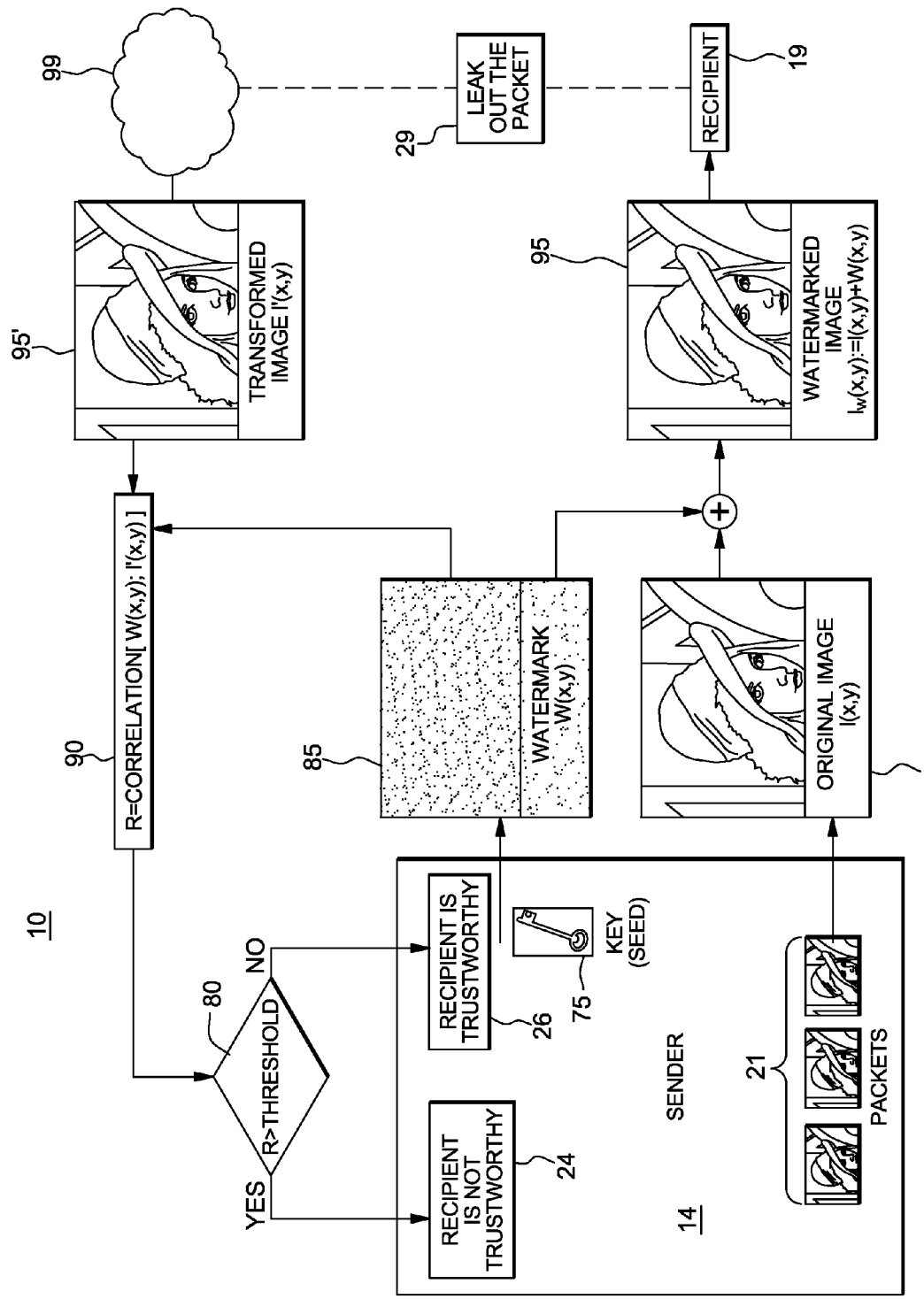
FIG. 1 illustrates a system 10 for preventing data leakage in an information sharing domain that includes a sender who sends information to one or more trustworthy or nontrustworthy recipient(s) and implements a POMDP solver for determining sender sharing actions in subsequent decision epochs.

FIG. 1 illustrates a system 10 for preventing data leakage in an information sharing domain that includes a sender who sends information to one or more trustworthy or nontrustworthy recipient(s) and implements a POMDP solver for determining sharing actions in subsequent decision epochs based on only partial or imperfect monitoring data. The use of the POMPD model for modeling a problem of information leakage is now described in greater detail.

In one embodiment, as shown in a system 10 depicted in FIG. 1, a sender 14 sends an information "packet" 21, e.g., an object, a song file such as an *.mp3, an image, a audio-visual presentation, a movie, or like digital (media or data) file, to a recipient, 19, e.g., who may purchase the packet from the Internet. In the process, a recipient may be trustworthy or non-trustworthy (i.e., may have designs to share the packets to others).

Typically, an associated DRM (digital rights management), such as a watermark, is applied by the sender to the original image file and sent as a transformed image to the recipient 19. Several commercial products are available at https://www.digimarc.com/ and include products that check for watermarks in digital content. One common method used in a leakage detector (especially for digital images) is to compute correlation between the image and a secret key. A leakage detector including correlator can be connected as part of an Internet Service Provider (ISP) infrastructure or, for example in enterprise networks at ingress/egress routers.

In an example implementation, a digital watermarking based monitoring mechanism to detect information leakage is provided. FIG. 1 shows how digital watermarking works in a simple spatial domain (2-dimensional image): As shown in FIG. 1 there is generated a watermark W(x; y) 85 using a secret key 75 chosen by the sender 14 such that W(x; y) is indistinguishable from random noise for any entity that does not know the key 75 (i.e., the recipient(s)). A key may comprise a tamper-resistant signature used for marking digital media, for example. The sender 14 adds the watermark W(x; y) 85 to the information object (image) I(x; y) 65 to obtain a watermarked image $I_W(x; y)$ 95 before sharing it with the recipient(s) 19. It is then hard for any recipient to guess the watermark W(x; y) (and subtract it from the transformed image I'(x; y)) 95'; the sender on the other hand can easily extract and verify a watermark (because it knows the key 75). The recipient 19 may attempt to corrupt the information object (e.g., toggle a few bits in the image file) with the goal of erasing the watermark to avoid detection. However, it is noted that in a pathological scenario, a recipient may corrupt the entire information object, thereby successfully erasing the watermark completely. Fortunately, corrupting an information object devalues it and thus, in such scenario, the leaked information is worthless. Thus, there is a clear trade-off between the extent of corruption (and the residual value of the corrupted information object) and the false positive/false negative probabilities of the watermark detection algorithm.

In one embodiment, the recipient 19 is assumed to be good or bad, or good with a certain probability. However, it may be desirable for a sender to continue sharing packets or not with recipient(s), depending upon the trustworthiness of the recipient(s). Thus, in one embodiment, the sender maintains a distribution of the recipient's trustworthiness and is able to modify the recipient's trustworthiness over time (not a fixed number).

That is, as shown in FIG. 1, after sending the packets of the watermarked image 95 to the recipient(s), the Internet 99 and/or other communications network(s) and communications channels are monitored (e.g., a search conducted, e.g., by or at the initiation of the sender) to detect whether there has been any packet(s) leakage, as indicated at 29, of the watermarked image $I_W(x; y)$ 95. A packet(s) may be detected as leaked by the recipient if there is detected a transformed image I'(x; y) 95' correlating to the watermarked image 95 with either its watermark removed (or partially removed to a certain extent). To determine likelihood of a watermark being removed by recipient, indicating potential leakage at 29, a correlator, implementing a correlation matrix 90 in one embodiment, is applied to determine if the watermark had been removed (and to what extent) by recipient. Thus, implementation of a correlation matrix 99 results in computation of a correlation value "R" which may be used to determine the extent of packet corruption, if at all, i.e., and thus leakage amount. In system 10 shown in FIG. 1, at 80, this correlation amount R is compared against a threshold value which provides a confidence level as to whether the original water mark was originally included (and detected as removed). That is, in verifying the presence of a watermark, a determination is made as to whether the detected transformed image I'(x; y)) 95' is equal to the original watermarked image $I_W(x; y))$ 95. If W(x; y) 85 (applied to the information object (image) I(x; y) 65 before sharing it) correlates to the detected (potentially transformed) image. Thus, if detected transformed image I'(x; y)) 95' does not correlate within some threshold value of the original watermarked image $I_W(x; y))$ 95 then the transformed image I'(x; y)) 95' is not the original and, consequently, not indicative of packet leakage in which case the recipient is deemed trustworthy 26; and, if the detected transformed image I'(x; y)) 95' does correlate within a threshold determination to the original watermarked image $I_W(x; y))$ 95 then the transformed image is the original and thus indicative of packet leakage in which case the recipient is deemed not trustworthy 24.

As the technique for leakage detection mechanism is not perfect, e.g., the component to detect leakage may be noisy there is inherent uncertainty in detecting information leakage. Consequently, current models fail to model the uncertainty in detecting good/bad behavior when making appropriate reward/punishment decisions. This uncertainty in detecting information leakage is modeled in the POMDP model described herein.

In one embodiment of the invention, POMDPs are employed to help the sender 14 (information source) characterize strategies of information sharing (what to share with whom?) and understand the optimal corruption strategies for a malign recipient 19.

Figure 2:
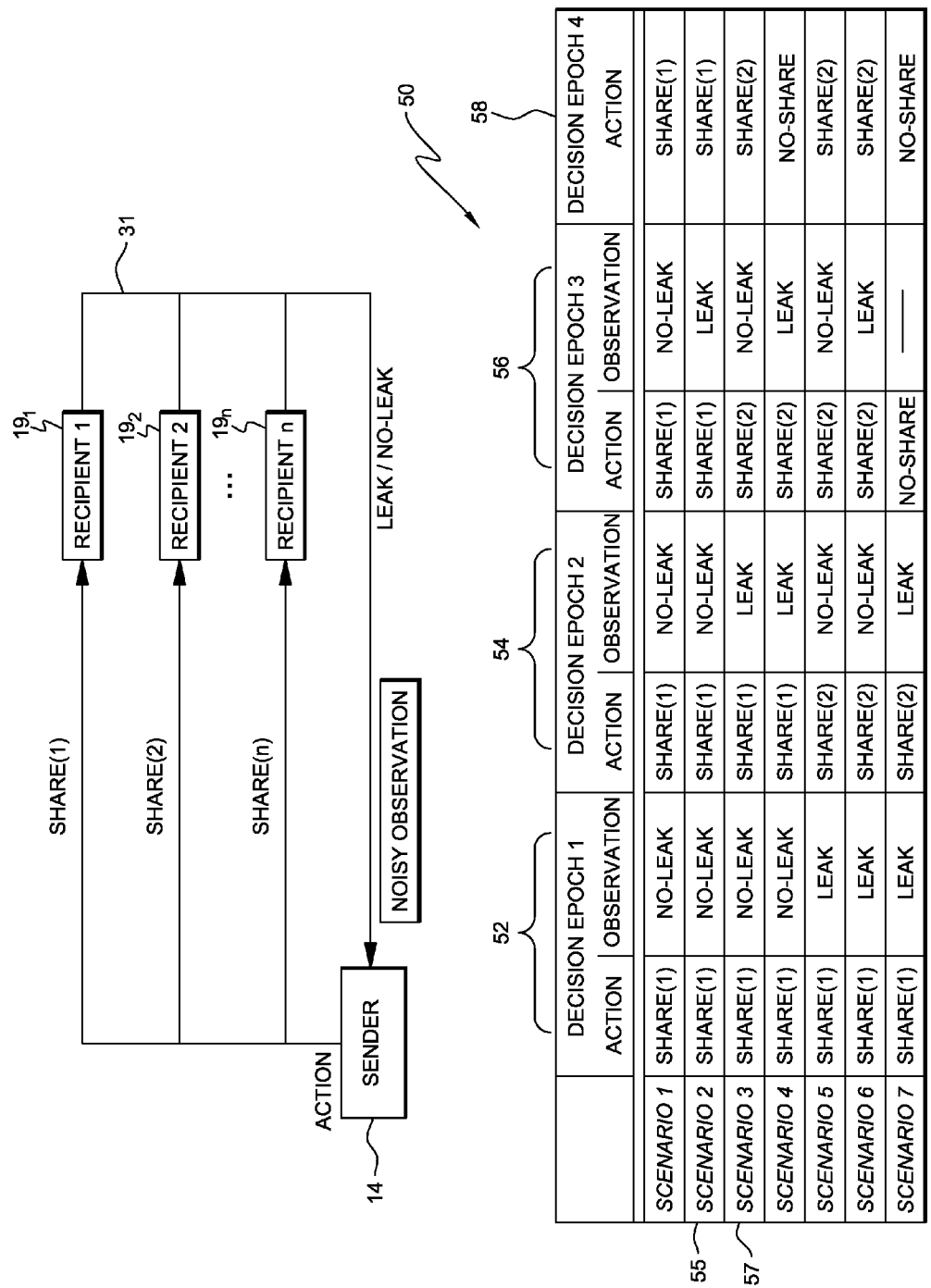
FIG. 2 depicts the iterative nature of the system 10 shown in FIG. 1, in which sender 14 may share a packet with one or multiple recipients $19_1, \ldots, 19_N$.

Referring to FIG. 2, there is depicted conceptually the iterative nature of the system 10 shown in FIG. 1, in which sender 14 will share a packet (e.g., digital file) with one or multiple recipients $19_1, \ldots, 19_N$. At a point in time, a packet or file is first shared with a recipient, e.g., first recipient $19_1$. After sharing the packet with first recipient $19_1$, the sender waits for an observation about a potential leakage 31 in the manner described herein with respect to FIG. 1. Upon receiving the observation 31 (leakage or not), the sender updates the distribution of the trustworthiness of that first recipient $19_1$. It is understood that the observation may be noisy, i.e., leakage detection mechanism may be imperfect. Then, continuing, the sender may make another decision as to which recipient to continue sharing the packet with. Table 50 shown in FIG. 2 depicts several the action—observation scenarios for method performed by system 10 as depicted in FIG. 2. Continuing in time, with reference to $2^{nd}$ scenario 55, in table 50, in first decision epoch 52, sender 14 has taken action (share(1)) for sharing a packet with first recipient $19_1$, and as the observation indicates "no leak". The sender decides to keep sharing with first recipient $19_1$ as indicated in decision epoch 54 of scenario 55 where again, sender 14 has taken action (share (1)) for sharing a packet with first recipient $19_1$, and the observation indicates "no leak". However, with respect to a third decision epoch 56 of scenario 55, there is indicated the sender sharing a packet with first recipient $19_1$, however, the observation indicates "leak". In the example depicted, in a fourth decision epoch 58 of scenario 55, the sender 14 has decided to take the same action (share(1)) for sharing a packet with first recipient $19_1$ because due to past exchanges of information, confidence has been built between sender and first recipient $19_1$ and the leakage observed during the third epoch 56 has been attributed to be noise or error. Thus, the longer that information is exchanged with a recipient, with no observed leakage over several decision epochs, the recipient have earned enough trustworthiness and confidence built between sender and recipient that will dictate continued interactions between the sender and first recipient $19_1$.

This is to be contrasted with a scenario 3, where in first decision epoch 52, sender 14 has taken action (share(1)) for sharing a packet with first recipient $19_1$, and the observation indicates "no leak". However, with respect to the second decision epoch 54 of scenario 57, there is indicated the sender sharing a packet with first recipient $19_1$(share(1)), however, the resulting observation indicates "leak". As a result first recipient $19_1$ has earned a decreased confidence in trustworthiness in this scenario, and as a result, at the third decision epoch 56 of scenario 57, there is indicated the sender 14 sharing a packet with second recipient $19_2$ (share(2)). That is, due to decreased confidence about the trustworthiness of first recipient $19_1$, the sender 14 has decided to send the packet to another recipient, e.g., the second recipient $19_2$, in third decision epoch 56. Thus, with respect to scenario 55, in one embodiment, a policy is implemented to maintain the distribution of the trustworthiness of the recipient (albeit the distribution is dynamic) in that the leakage detection mechanism is imperfect (i.e., the longer the observations over time, the less likely a recipient trustworthiness is decreased); while in scenario 57, a policy is implemented such that the trustworthiness of the recipient is reduced due to observed leakage over a smaller amount of decision epochs.

That is, for each scenario, there is computed, an expected total payoff for the sender depending upon which scenario it follows. For example, in Table I, shown in FIG. 8, an optimal policy of the sender yields an expected reward value of 2.81 and this policy is shown for 5 selected action-observation scenarios and 4 initial decision epochs.

Partially Observable Markov Decision Processes (POMDPs) such as described in the reference to E. J. Sondik entitled "The optimal control of partially observable Markov processes," in Ph. D Thesis. Stanford University, 1971, the whole contents and disclosure of which is incorporated by reference as if fully set forth herein, are defined as follows: S is a finite set of discrete states of a process and A is a finite set of agent actions. The process starts in state $S_0$ "belongs-to" S and runs for N decision epochs. In 0 "less-than-or-equal-to" n<N, the agent controlling the process chooses an action a "belongs-to" A to be performed next. The agent then receives the immediate reward R(s, a) while the process transitions with probability P(s'|s, a) to state s' "belongs-to" S and decision epoch n+1. Otherwise, if n=N, the process terminates. The goal of the agent is to find a policy "pi" that, for each epoch 0 "less-than-or-equal-to" n<N, maximizes the sum of expected immediate rewards earned in epochs n, n+1, . . . , N when following policy "pi". What complicates the agent's search for "pi" is that the process is only partially observable to the agent. That is, the agent receives noisy information about the current state s "belongs-to" S of the process and can therefore only maintain a probability distribution b(s) over states s "belongs-to" S (referred to as the agent belief state). Specifically, when the agent executes an action a "belongs-to" A and the process transitions to state s', the agent receives with probability O(z| a, s') an observation z from a finite set of observations Z. The agent then uses z to update its current belief state b, as described in the incorporated E. J. Sondik reference.

A policy "pi" of the agent therefore indicates which action "pi"(n, b) "belongs-to" A the agent should execute in decision epoch n in belief state b, for all 0 "less-than-or-equal-to" n<N and all belief states b reachable from an initial belief state $b_0$ after n agent actions. To date, a number of efficient algorithms have been proposed to find a policy "pi" that yields the maximum expected reward for the agent. In one embodiment, a POMDP solver is used based on a point-based incremental pruning technique such as, for example, found in the reference to J. Pineau, G. Gordon, and S. Thrun, entitled "PBVI: An anytime algorithm for POMDPs," in IJCAI, 2003, pp. 335-344 ("Pineau et al."). Alternate algorithms that may be employed to find a policy "pi"* that yields a maximum expected reward for an agent (sender) is provided in references to M. Hauskrecht entitled "Value-function approximations for POMDPs," JAIR, vol. 13, pp. 33-94, 2000; C. Poupart, P.; Boutilier entitled "VDCBPI: An approximate scalable algorithm for large scale POMDPs," in NIPS, vol. 17, 2004, pp. 1081-1088; Z. Feng and S. Zilberstein, "Region-based incremental pruning for POMDPs," in UAI, 2004, pp. 146-15; T. Smith and R. Simmons entitled "Point-based pomdp algorithms: Improved analysis and implementation," in UAI, 2005; M. T. J. Spaan and N. Vlassis entitled "Perseus: Randomized point-based value iteration for POMDPs," JAIR, vol. 24, pp. 195-220, 2005; and, P. Varakantham, R. Maheswaran, G. T., and M. Tambe entitled "Towards efficient computation of error bounded solutions in POMDPs: Expected value approximation and dynamic disjunctive beliefs," in IJCAI, 2007, the whole content and disclosure of each of which is incorporated by reference as if fully set forth herein.

In one embodiment, preventing data leakage in domains of increased complexity allows to employ POMDPs to characterize optimal information sharing strategies for the sender and optimal watermark corruption strategies for a maligned recipient. There is provided a domain with a single, deterministic recipient (who either leaks out all the packets it receives or none of them). Further, the assumption that the recipient is deterministic is relaxed by considering a fuzzy recipient who leaks f% of the packets it receives. In one aspect, the POMDP models are generalized to domains where the sender shares information with multiple fuzzy recipients (each leaking a different percentage of packets it receives).

Figure 3:
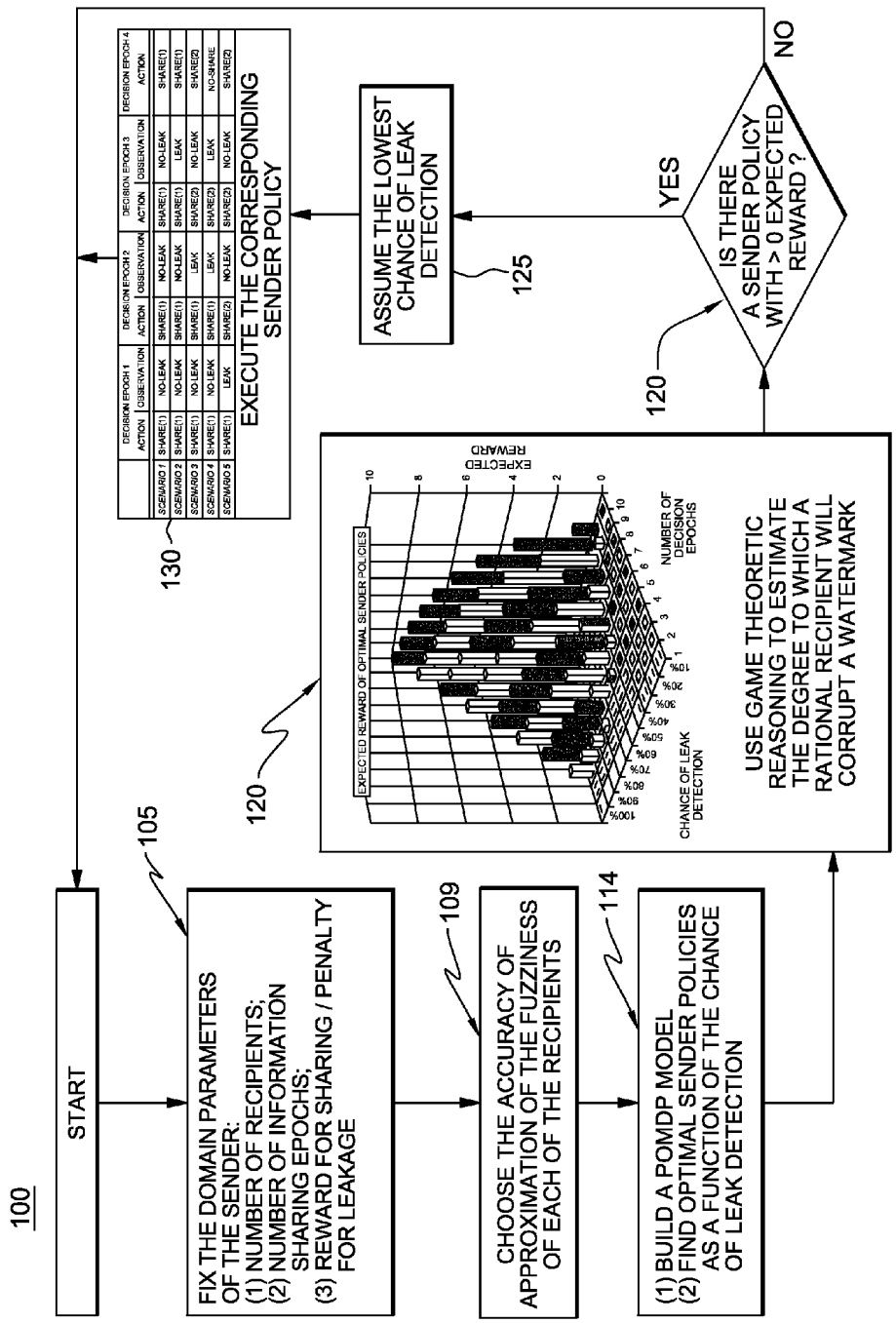
FIG. 3 depicts a methodology 100 for leakage detection using the POMPD algorithm in one embodiment.

FIG. 3 depicts a methodology 100 for leakage detection using the POMDP algorithm in one embodiment. Although the methodology is described in an example scenario of one or more fuzzy recipient(s) where the recipient(s) leaks undetermined amount f % of packets in a decision epoch, the method shown in FIG. 3 is additionally applicable for a single recipient (deterministic) and multiple recipients as described in greater detail herein below. As indicated at 105, there is provided parameter data input to a computing system that includes a programmed processor device for use by the POMDP algorithm. The parameter data includes: the number of recipients; a number of information sharing epochs (time intervals "n" where $0 \le n < N$); and, a reward value for successful sharing and a penalty value for detecting a leakage. When performing in a complex domain where the recipient(s) is(are) fuzzy, i.e., the recipient(s) leaks undetermined amount f % of packets in a decision epoch, at 109, there is further input to the POMDP model an accuracy of the approximation of the fuzziness level of each recipient. Then, at 114, the POMDP model is built and the POMPD problem solver provides solutions to the POMDP model to determine optimal sender policies "pi" as a function of the chance of leak detection. It is understood that the POMPD model is updated at 114 every N decision epoch if the model parameters specified by 105 and 109 happen to change. Thus, for example, as long as domain parameters such as the number of decision epochs, the rewards for sharing/leaking a packet, the number of recipients and the chance of leak detection do not change, the POMDP model is "not" updated; however, the current belief state of the "current" POMDP model is updated. Only when the domain parameters change (e.g., when the reward for leaking a packet becomes smaller/bigger), one has to stop the execution of the current policy, build an updated POMDP model that reflects the changes in the domain, then solve this updated model to obtain a new optimal policy and finally proceed with the execution of this policy. The result solution of the POMDP model, in an example embodiment, at a particular time epoch, is shown in FIG. 3 at 120 and is described in greater detail herein below in view of FIG. 4. These results are presented to the sender, e.g., in view of a display interface or, as a tree structure, and analyzed by the sender to make a sharing decision with respect to one or more recipients. In one aspect, the POMDP problem solver provides an expected reward value "V" for a particular sharing policy and, a determination is made as to a sharing policy having a largest expected reward value or, a policy having an expected reward value greater than zero (>0). The Appendix A provided herein provides one technique for calculating an expected reward value function as part of the POMDP model solution. In one embodiment, at 125, a lowest chance of leak detection may be assumed and a policy decision for sharing is performed at 130. That is, for a fixed number of decision epochs, expected reward of an optimal sender policy varies depending on the chance of leak detection. Both the sender and the recipient are aware of this. A rational recipient may then choose the "chance of leak detection" value that ensures that the sender starts the packet sending process (which is the case when the expected reward of a sender policy is >0). For example, with 5 decision epochs, the recipient would choose the chance of leak detection to be no less than 30%, to ensure that a corresponding optimal policy of the sender has a >0 reward. On the other hand, the recipient will choose a "chance of leak detection" parameter that provides the sender with the minimal (>0) expected reward. The sender knows that a rational recipient will act like this and therefore, the sender assumes the lowest chance of leak detection for which the sender has an optimal policy that yields >0 expected reward. If the sender somehow knows what is the chance of leak detection (the efficacy of the leakage detection mechanism), then this step is optional. For example, depending upon the information sharing domain and POMDP solver results, a sharing policy such as shown in TABLES I-IV (FIGS. 8-11) may be performed.

One Deterministic Recipient

For the case of a data leakage prevention domain involving a single information recipient (i.e., K=1) who acts in a deterministic way (leaks either 0% or 100% of all the packets it receives), such domain is modeled using POMDPs as follows: The set of states is $S=\{s_0, s_{100}\}$ where $s_0$ denotes a state where the recipient leaks 0% of the packets it receives whereas $s_{100}$ denotes a state where the recipient leaks 100% of the packets it receives. The set of sender actions is $A=\{a_{noShare}, a_{Share}\}$ where action $a_{noShare}$ results in the sender not sharing a packet with the recipient and $a_{Share}$ in sharing exactly one packet with the recipient, in some decision epoch. In one embodiment, it is assumed that the recipients never change the percentage of packets they leak out, and thus, the transition function is given by $P(s_0|a_{noShare}, s_0)=P(s_0|a_{Share}, s_0)=P(s_{100}|a_{noShare}, s_{100})=P(s_{100}|a_{Shore}, s_{100})=1$. The set of sender observations is $Z=\{z_{Leak}, z_{noLeak}, z_0\}$ where, according to $z_{Leak}$, the last-shared packet has been leaked and, according to $z_{noLeak}$, the last-shared packet has not been leaked. The sender receives an empty observation $z_0$ when it does not share a packet with the recipient. (Note, that because $z_0$ carries no information about the status of shared packets, it also does not affect the current sender estimate of the trustworthiness of the recipient. Also, because of the false positive/false negative observations, there may be $O(z_{Leak}|a_{Share}, s_0) > 0$ and $O(z_{Leak}|a_{Share}, s_{100}) < 1$.) Finally, there is had $R(s_0, a_{noShare})=R(s_{100}, a_{noShare})=0$ (not sharing a packet provides the sender with no reward/penalty) and $R(s_{100}, a_{Share}) < 0 < R(s_0, a_{Share})$ (sharing a packet is beneficial to the sender only if the packet is not leaked). To illustrate a domain with a deterministic recipient on an example assume N=10 decision epochs, rewards $R(s_0, a_{Share})=2$; $R(s_{100}, a_{Share})=-1$, observation function $O(z_{Leak}|a_{Share}, s_0)=10\%$, $O(z_{NoLeak}|a_{Share}, s_0)=1-O(z_{Leak}|a_{Share}, s_0)=90\%$, $O(z_{NoLeak}|a_{Share}, s_{100})=30\%$, $O(z_{Leak}|a_{Share}, s_{100})=1-O(z_{NoLeak}|a_{Share}, s_{100})=70\%$, $O(z_0|a_{NoShare}, s_0)=O(z_0|a_{NoShare}, s_{100})=100\%$ and initial sender belief about the trustworthiness of the recipient $b_0(s_0)=b_0(s_{100})=50\%$. In such setting, the optimal policy of the sender yields the expected reward value "V" of 2.81. In Table I, shown in FIG. 8, this policy is shown for 5 selected action-observation scenarios and 4 initial decision epochs.

The reference to J. Pineau, G. Gordon, and S. Thrun entitled "PBVI: An anytime algorithm for POMDPs," in IJCAI, 2003, pp. 335-344 provides, in Section 2, a derivation of the value function V, using equations 2,3,4,5,6,7 as described herein in Appendix "A". In the data leakage prevention application it is further assumed that the starting belief state b is given, that is, that b is a uniform distribution over the states of the POMDP.

The policy in Table 1, FIG. 8, confirms intuitions about the domain with just one deterministic recipient: First (scenario 1), if the sender does not observe any leaked packets, it keeps sharing the packets with the recipient. Second (scenario 2), if the sender does not observe any leaked packets in the 1st and 2nd decision epochs, it builds enough confidence of the trustworthiness of the recipient so that, when a packet is observed to be leaked out in 3rd decision epoch, the sender attributes this leakage to its imperfect observations and resumes sharing the packets with the recipient in the 4th decision epoch. Third, (scenario 4) if the sender does not observe any leaked packets in the 1st decision epoch, but observes two consecutive leaked packets in the 2nd and $3^{rd}$ decision epochs, the sender confidence of the trustworthiness of the recipient drops below a threshold where the sender decides to stop sharing further packets with the recipient. Finally, (scenario 5) if the sender observes a leaked packet in the 1st decision epoch, it attributes this leakage to a malevolent recipient (rather than to an imperfect observation) and never attempts to resume sharing packets with the recipient. (Note that not sharing any packets with the recipient provides no further observations to the sender and thus, the sender confidence of the trustworthiness of the recipient will not change. However, by considering $P(s|a, s)<1$ for some a "belongs-to" A, s "belongs-to" S one can model a sender who is forgiving towards the recipient. The optimal policy of a forgiving sender might then include a series of $a_{noShare}$ actions preceding a $a_{Share}$ action, so that the impact of the old observations on the current belief state is less significant.)

One Fuzzy Recipient

In a more complex data leakage prevention domain where the recipient is fuzzy, i.e., leaks f % of the packets it receives thus appearing (to the sender) to be benevolent in some decision epochs and malevolent in other decision epochs, such domain is modeled using POMDPs that addresses the fact that the recipient's fuzziness "f" is never known to the sender, and can only be estimated by the sender, using the observations it receives. In such a domain, the sender maintains a probability distribution over all possible recipient fuzziness levels, i.e., a probability distribution over the probabilities with which the recipient can leak the packets. Because the number of all possible recipient fuzziness levels is infinite (f "belongs-to" [0, 1]), one cannot use POMDPs to model a fuzzy recipient exactly (due to an infinite POMDP state-space and the corresponding infinite transition/observation/reward functions). A problem of having to consider an infinite number of possible recipient fuzziness levels is circumvented by approximating the actual (unknown) recipient fuzziness level f within some error $\epsilon$ with only a finite set M of chosen fuzziness levels. Precisely, M is chosen to contain $[1+(1/(2*\epsilon))]$ uniformly distributed fuzziness levels so that for any (f "belongs-to" [0, 1]) there always exists some m "belongs-to" M where $|f-m|<\epsilon$. The set of POMDP states is then $S=\{s_m\}_{m \in M}$ where $s_m$ is a state wherein the recipient leaks m % of the packets it receives. The set of sender actions and observations, $A=\{a_{noShare}, a_{Share}\}$ and $Z=\{z_{Leak}, z_{noLeak}, z_0\}$ respectively, are the same as for a deterministic recipient. Similarly, (assuming that the recipient never changes the percentage of packets it leaks) the transition function is defined as $P(s_m|a_{Share}, s_m)=P(s_m|a_{NoShare}, s_m)=1$ for all $s_m$ "belongs-to" S. In defining the sender observation and reward functions, one needs to use the extreme values of these functions for a deterministic recipient case (when the recipient leaks 0% and 100% of packets it receives). Specifically, if the process is in state $s_m$ "belongs-to" S and the sender executes action $a_{Share}$, there is m % chance that the packet will be leaked and (100−m) % chance that the packet will not be leaked and thus, $R(s_m, a_{Share})=(m/100)*R(s_{100}, a_{Share})+((100-m)/100)*R(s_0, a_{share})$. Similarly, (recall that the sender detects a leak if the leak really occurred with probability $O(z_{Leak}|a_{Share}, s_{100})$ and, if the leak did not occur, with probability $O(z_{Leak}|a_{Share}, s_0)$) if the process is in state $s_m$ "belongs-to" S and the sender executes action $a_{Share}$, it will observe a leak with probability $O(z_{Leak}|a_{Share}, s_m)=(m/100)*O(z_{Leak}|a_{Share}, s_{100})+((100-m)/100)* O(z_{Leak}|a_{Share}, s_0)$.

To illustrate a domain with a fuzzy recipient, in the following example, it is assumed that the recipient fuzziness f is approximated with a set of fuzziness levels M={0%; 33%; 66%; 100%}. Also, let N=10, $R(s_0, a_{Share})=2$, $R(s_{100}, a_{Share})=-1$, $O(z_{Leak}|a_{Share}, s_0)=10\%$, $O(z_{Leak}|a_{share}, s_{100})=70\%$—exactly as in the deterministic recipient case. Similarly, the initial belief state of the sender is uniform, i.e., $b_0(s_m)=0.25$ for all $m \in M$. In such setting, the optimal policy of the sender yields the expected reward of 2.23. In Table II, FIG. 9, this policy is shown for 7 selected action-observation scenarios and 4 initial decision epochs.

As can be seen in FIG. 9, the optimal policy of the sender when facing a fuzzy recipient (Table II) differs from the optimal policy of the sender when the recipient is deterministic (Table I). Specifically, the sender is more tolerant of packet leaks (compare scenarios 5 in Table I, FIG. 8 with scenarios 5, 6, 7 in Table II, FIG. 9): Even if a packet shared in the 1st decision epoch is observed to be leaked, the sender decides to share another packet in the 2nd decision epoch. This phenomenon occurs because, for a leak detection probability $O(z_{Leak}|a_{Share}, s_{100})$ approaching 100%, whenever the sender detects a leak of a deterministic recipient, the sender considers the recipient to be almost 100% non-trustworthy; In contrast, if the leak is caused by a fuzzy recipient (of fuzziness f), the sender knows that there is still a (100−f) % chance that the recipient will not leak further packets. Increased sender tolerance of leaked packets has an impact on the expected reward of its optimal policy; it amounts to only 2.23 as opposed to 2.81 if the recipient is deterministic.

Multiple Recipients

More complex data leakage prevention domains have the sender shares packets with multiple recipients, each recipient potentially leaking a different percentage of packets it receives. That is, there is now considered situations where a sender can choose which recipient (if any) should receive a packet in each decision epoch. In modeling such domains involving K>1 recipients there is first chosen the accuracy with which the actual (unknown) fuzziness values of each of the K recipients are to be approximated. Specifically, it is assumed that a set $M_k$ of fuzziness levels that approximate the (unknown) fuzziness of recipient k for each recipient k "belongs-to" K. (As shown below, sets $M_k$ need not to be equal as the sender might desire higher accuracy in approximating the fuzziness of more important recipients.)

A POMDP for a domain with multiple recipients is then defined as follows: Let $m=(m_1, \ldots, m_K)$ be a vector such that $m_k$ "belongs-to" $M_k$ is the chance that recipient k leaks a packet it receives, for k "belongs-to" K. The set of states is then $S=\{s_m\}_{m \in M1 \times \ldots \times MK}$. Because in each decision epoch the sender can share a packet with at most one recipient, the set of actions is $A=\{a_{noShare}, a_{Share(1)}, \ldots, a_{Share(K)}\}$ where $a_{Share(k)}$ is an action that the sender executes to share a packet with recipient k. When the process is in state $s_m$ and the sender executes action $a_{Share(k)}$, the process transitions to the same state $s_m$ (recipients' fuzziness values never change) with probability 1. The sender then gets reward $R(s_m, a_{Share(k)}) \equiv R(s_{mk}, a_{Share})$ where the latter term is the sender reward in a single recipient case, as defined earlier (It is noted that the sender could vary the importance of sharing the packets with different recipients by assuming that different recipients offer different rewards for received packets). Finally, the set of observations $Z=\{z_{Leak}, z_{noLeak}, z_0\}$ is the same as in the one recipient case, because the last performed action uniquely identifies the recipient who affects the sender last observation. As such, the observation function only depends on the fuzziness of the recipient that the packet was sent to, and thus, $O(z_{Leak}|a_{Share(k)}, s_m) \equiv O(z_{Leak}|a_{Share(k)}, s_{mk})$ where the latter term is the sender observation function in a single recipient case, as defined earlier.

To illustrate a domain with multiple recipients on an example assume K=2 recipients whose fuzziness values are approximated with different accuracy, i.e., M1={0%, 100%} and M2={0%, 33%, 66%, 100%}. Also, let N=10, $R(s_0, a_{Share})$=2, $R(s_{100}, a_{Share})$=1, $O(z_{Leak}|a_{Share}, s_0)$=10%, $O(z_{Leak}|a_{Share}, s_{100})$=70%—exactly as in a single recipient case. Similarly, let the initial belief state of the sender be uniform, i.e., $b_0(s_m)$=0.5*0.25=0.125 for all m "belongs-to" $M_1 \times M_2$. In such setting, the optimal policy of the sender yields the expected reward of 3.27. In Table III, FIG. 10, this policy is shown for 7 selected action-observation scenarios and 4 initial decision epochs.

As can be seen in Table III (scenario 1), the sender always starts its optimal policy by sharing a packet with recipient 1, because recipient 1 appears to the sender to be more predictable (its fuzziness is approximated with fewer fuzziness levels) and consequently, it is easier for the sender to identify the trustworthiness of recipient 1 than to identify the trustworthiness of recipient 2. Next in Table III (scenario 2), if the sender observes no leaks while sharing the packets with recipient 1 in the $1^{st}$ and 2nd decision epoch, it builds enough confidence about the trustworthiness of recipient 1 so that, even if a leak is observed after sharing a packet with recipient 1 in the $3^{rd}$ decision epoch, the sender attributes this leak to its imperfect observations and decides to resume sharing packets with recipient 1 in the 4th decision epoch. However, (scenarios 3,4) if the sender observes no leak while sharing a packet with recipient 1 in the 1st decision epoch, but observes a leak while sharing a packet with recipient 1 in the 2nd decision epoch, sender confidence about the trustworthiness of recipient 1 is too low and the sender decides to switch to sharing the packets with recipient 2. In particular, (scenarios 4, 7 in Table III) if recipient 2 is also observed to be leaking the packets, the sender decides to stop sharing the packets with the recipients. Note that the sender ability to choose a recipient to share a packet with results in an increased expected reward of its optimal policy (equal to 3.27 as opposed to 2.81 and 2.23 when K=1).

Recipient Strategy

The methods for computing the sender policy assume that the number of decision epochs and the sender observation function (the accuracy of the mechanism that examines a watermark to determine if a packet is leaked or not) are fixed and known to both parties. Yet, there may be situations where the recipient can try to remove the watermarks from the packets, in an attempt to disguise the packets it leaks. In these situations, recipient's tampering with the watermark has a direct impact on the sender observation function. While this may seem to complicate the sender decision making, it is shown in the following that this is not the case: If both the sender and the recipient are rational and if they both know the domain parameters, the recipient strategy (how much it tampers with watermarks to obfuscate sender observations) is predictable, allowing the sender to compute its optimal policy when facing such a recipient. Note that it is of clear interest to the recipient to tamper with the watermarks. If the recipient leaves the watermarks intact, each time it leaks a packet, the leak will be detected with 100% accuracy by the sender (who may consequently stop sharing the packets with the recipient). On the other hand, if the recipient completely prevents the sender from detecting a leak, the sender may have little incentive to even begin sharing the packets with the recipient. Exactly how much to corrupt the watermarks therefore constitutes a decision problem in itself that every rational recipient has to face.

Figure 4:
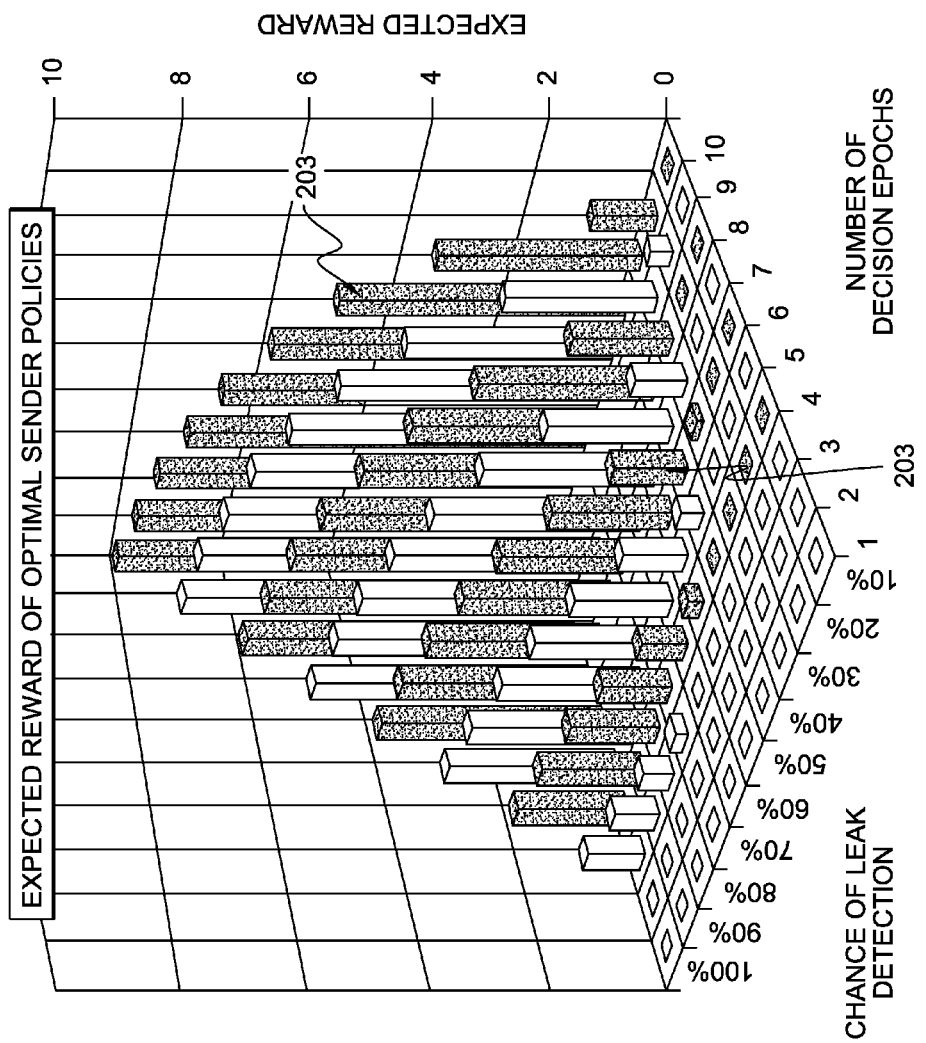
FIG. 4 depicts an example decision problem for an example domain with a deterministic recipient showing bars that represent the expected reward of the optimal sender policy for a given number of decision epochs N, a chance of leak detection, and an initial belief about recipient trustworthiness.

A decision problem on an example domain 200 with a deterministic recipient described herein above in now illustrated in view of FIG. 4. Referring to FIG. 4, each bar 203 represents the expected reward of the optimal sender policy for a given number of decision epochs N, a chance of leak detection $O(z_{Leak}|a_{Share}, s_{100})$ and an initial belief about recipient trustworthiness $b_0(s_0)=b_0(s_{100})$=50%. (For explanation purposes it is assumed no false negative observations: $O(z_{Leak}|a_{Share}, s_0)$=0.) As can be seen, the expected reward of an optimal sender policy can be either greater than zero, if the sender decides to share the packets with the recipient, or equal to zero, if the sender decides to not to share any packets with the recipient. Under these circumstances, the optimal strategy of a rational recipient will be to act in such a way that the chance of leak detection encourages the sender to share its packets, but provides the sender with as inaccurate information as possible about packet leaks. For example, if the number of decision epochs is 3, a rational recipient will allow the sender to detect a leak with 70% chance because that guarantees that the sender will start sharing the packets with the recipient but also ensures that sender observations will allow it to learn as little as possible about the packet leaks. A complete recipient strategy (Table IV, FIG. 11) is hence a mapping from the number of decision epochs to the chance with which the recipient allows the sender to detect a leak. If both the sender and the recipient are rational and if they both know the domain parameters, their information sharing and watermark corruption strategies form an Equlibrium that both players will adhere to. For example, a first *player* is the recipient who chooses a desirable "chance of leak detection". Then acts the second *player* (i.e., a sender) by assuming this "chance of leak detection" and responding to it optimally by committing to its optimal information sharing strategy with the recipient. The way the strategy of the first player (the recipient) is computed is as follows: First, the optimal strategies of the sender are computed, given all possible strategies of the recipient (e.g., chance of leak detection), e.g., hence there are ten (10) bars 203 shown in FIG. 4, for a given number of decision epochs. Focusing on a given number of decision epochs, e.g., decision epoch 6, a bar 205 is identified that has the minimal, non-zero value (of the optimal policy for the sender). The "chance of leak detection" that corresponds to this bar (40% in the example provided in FIG. 4) is the strategy that the first player (the recipient) should stick to, for it ensures that the sender will be sending packets to the recipient but also guarantees that the sender's utility will be as small as possible (=the recipient's utility will be as big as possible).

Figure 5:
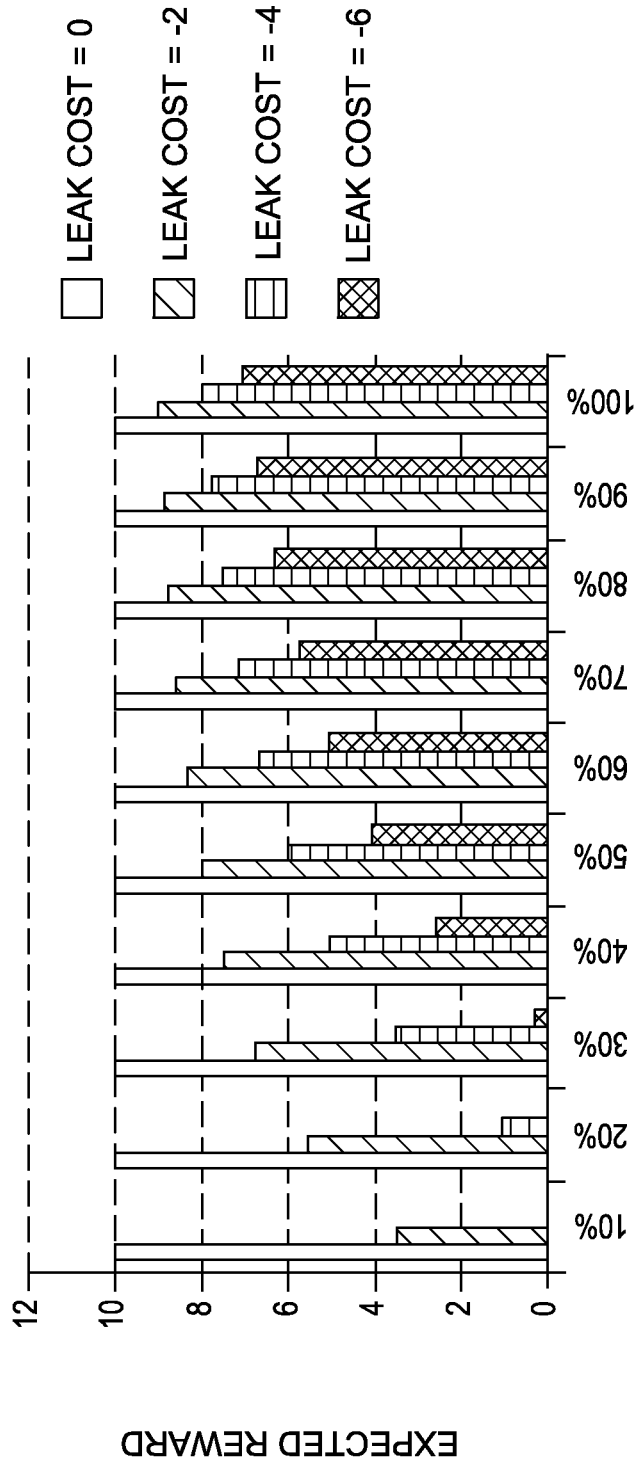
FIG. 5 depict example results as a result of investigating the sensitivity of the optimal sender policies to the changes in the chance of leak detection in a deterministic recipient domain.

The POMDP solver, such as described in herein incorporated Pineau et al. reference, is implemented to conduct sensitivity and scalability analysis of the method applied to data leakage prevention. That is, the sensitivity of POMDP policies (found using the POMDP solver) towards the changes in the parameters of a data leakage prevention domain is determinable. FIG. 5 depicts example results of a first experiment conducted to investigate the sensitivity of the optimal sender policies to the changes in the chance of leak detection in a deterministic recipient domain. In the first experiment illustrated in FIG. 5, the example assumes N=10 decision epochs, reward $R(s_0, a_{Share})=2$ for sharing a packet that is not leaked and an initial sender belief about the recipient trustworthiness $0(s_0)=b_0 (s_{100})=50\%$. Then there was recorded the expected reward of optimal sender policies (y-axis) considering various leak costs $R(s_{100}; a_{Share})=0, -2, -4, -6$ and various chances $O(z_{Leak}|a_{Share}, s100)$ of leak detection (x-axis). Results reveal that if the leak cost is 0, the chance of leak detection has no impact on the expected reward (=10) of the optimal sender policy. This is because when the sender shares the packets with only one recipient and there is no penalty for leaked packets, sender optimal policy is to share the packets in all the decision epochs, regardless of the trustworthiness of the recipient—thus, regardless of its observations and the chance of leak detection. However, in the example, when the leak cost is other than 0, smaller chances of leak detection translate into higher chances of the sender deciding not to share the packets with the recipient and consequently, smaller expected rewards of the optimal sender policies. Furthermore, increase in the absolute value of the leak cost appears to amplify this phenomenon. For example, a decrease of the chance of leak detection from 100% to 50% corresponds to 12% decrease (from 9 to 8) of the expected reward if leak cost is −2, 25% decrease (from 8 to 6) if leak cost is −4 and as much as 43% decrease (from 7 to 4) is the leak cost is −6. Thus, the greater the absolute value of the leak cost, the greater the sensibility of sender policy to the chance of leak detection.

Figure 6:
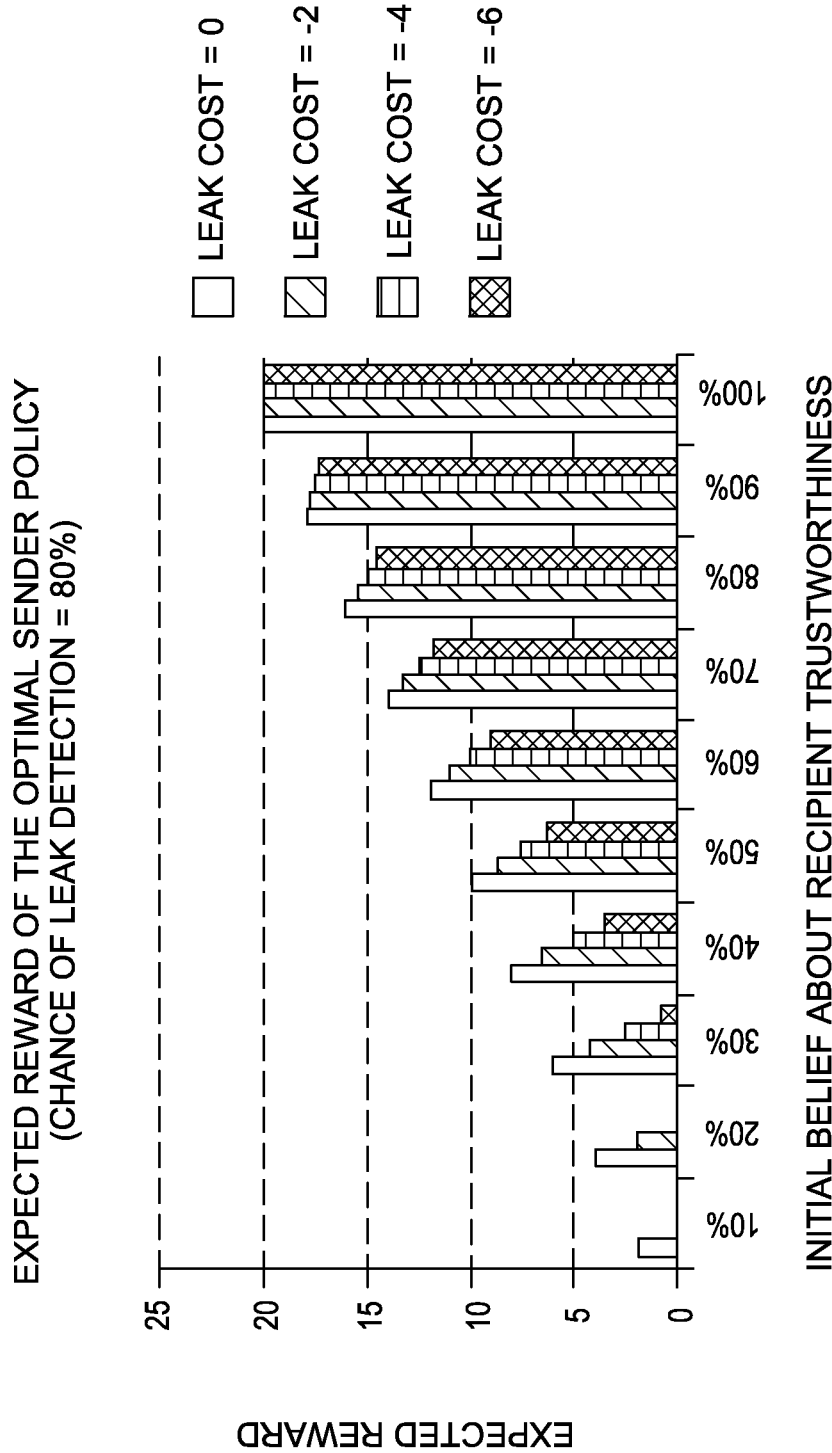
FIG. 6 depicts example results of a second experiment conducted to investigate the sensitivity of the expected reward of the optimal sender policies to different initial beliefs $b_0$; and, FIG. 7 illustrates graphically a trade-off of how much computational overhead can be afforded against how accurately it is desired to approximate one recipient for a domain with one recipient and 10 decision epochs.

FIG. 6 depicts example results of a second experiment conducted to investigate the sensitivity of the expected reward of the optimal sender policies to different initial beliefs $b_o$. The effect that the initial $b_0$ has on the expected reward of sender policies is orthogonal to that of the chance of leak detection, as revealed in the second experiment as shown in FIG. 6. Specifically, for a fixed chance $O(z_{Leak}|a_{Share}, s_{100})=80\%$ of leak detection, the greater the initial sender belief $b_0(s_0)$ about the trustworthiness of the recipient (x-axis), the higher the chance that the sender will share the packets with the recipient and consequently, the bigger the expected reward of the sender policy. Not surprisingly, if $b_0(s_0)$ drops below a certain threshold (e.g., 30% for the leak cost −4 and −6), the expected reward becomes 0 as it is not profitable for the sender to even start sharing packets with the recipient. On the other hand, the expected reward peaks at $b_0 (s_0)=100\%$ where it is invariant of the cost of leak and derived from $N \cdot R(s_0, a_{Share})=20$ (for $P(s_0|a_{Share}, s_0)=1$). Hence, the greater the initial belief $b_0 (s_0)$, the smaller the sensibility of the optimal sender policy to the leak cost.

Regarding a scalability analysis: the POMDP solver (such as herein incorporated to Pineau et al.) provides solutions for all possible starting belief states "b". In the data leakage prevention domain, it is already known what is going to be the value of "b" (i.e., a uniform distribution over the trustworthiness levels of the recipient, as sender does not know anything about the recipients). Although Pineau et al.'s POMDP solver can be used to find the solutions to the data leakage prevention problems, these solutions are found much faster than for a generic POMDP domain because (as stated earlier) a solution needs only to be found for a single (starting) belief state.

Referring to Table V, FIG. 12 various runtimes of the POMDP solver employed to find the optimal sender policies. In one implementation, the solver was run on a 2.4 GHz machine with 2 GB of RAM. As shown, the runtime increases for higher number of epochs, higher number of recipients, and higher number of fuzziness levels (used to approximate a fuzzy recipient. The less dramatic increase is related to the number of decision epochs, as the algorithm does not suffer severely from adding more epochs. However, increasing either the number of recipients or the number of fuzziness level results in a running time higher by almost an order of magnitude.

Figure 7:
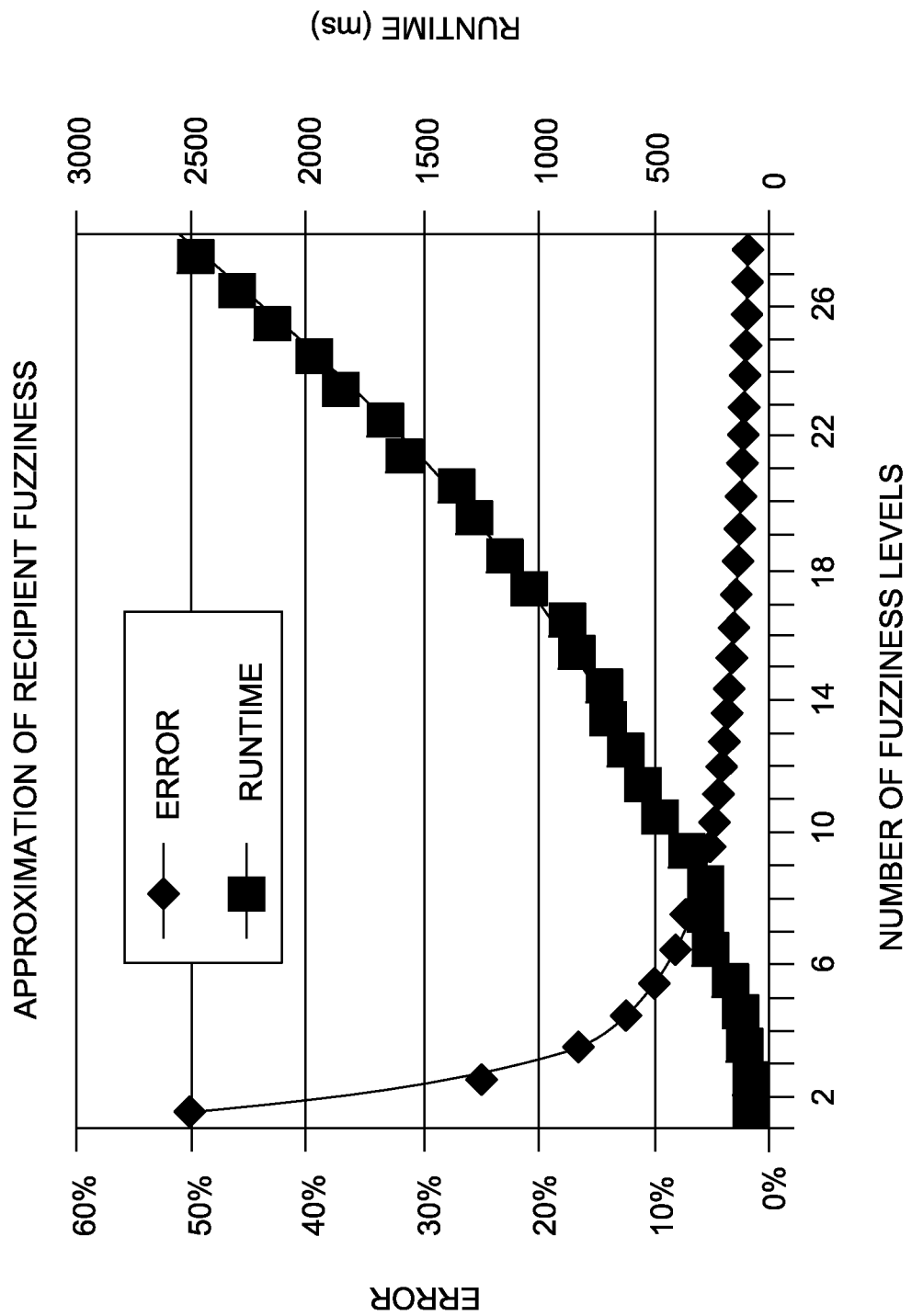
Figure 13:
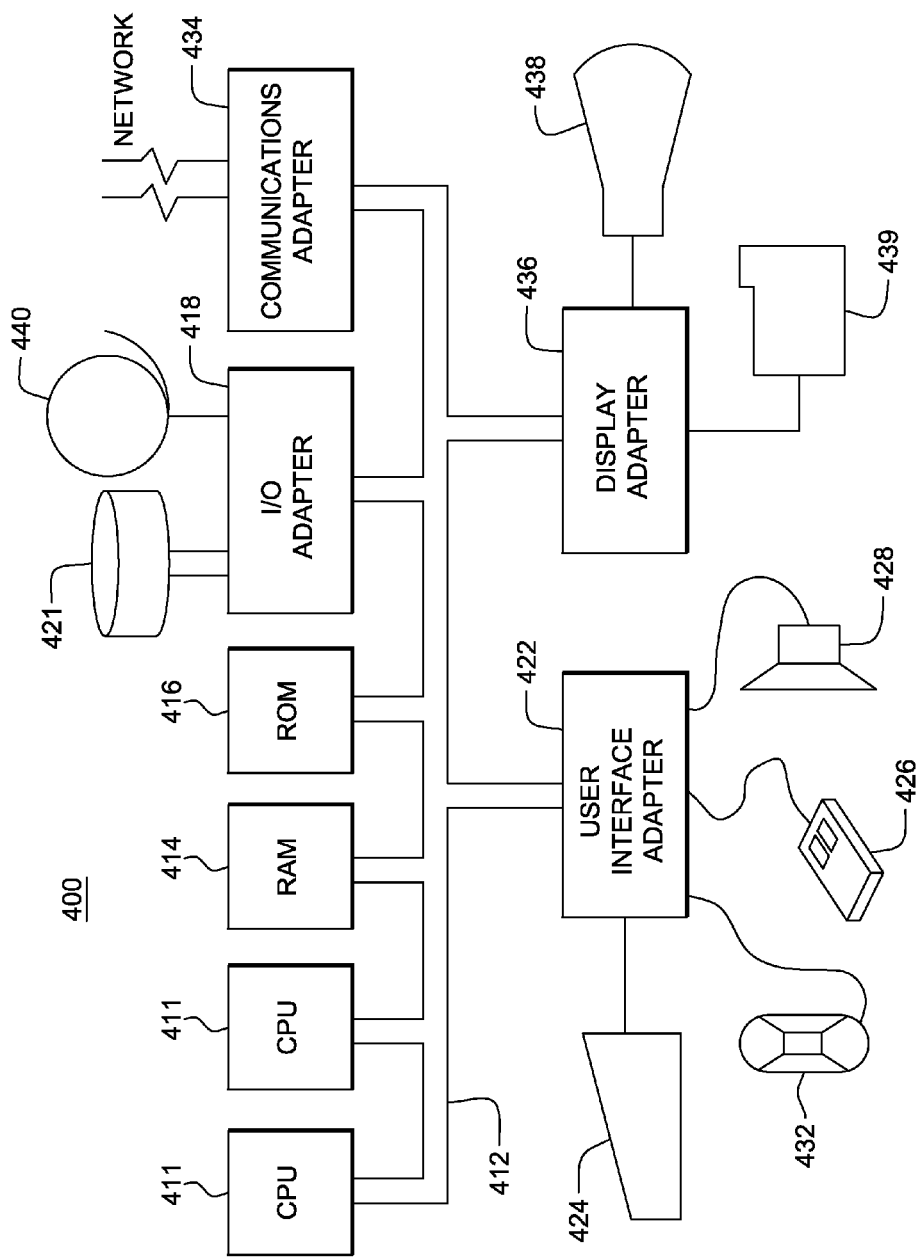
FIG. 13 illustrates an exemplary hardware configuration for implementing the flow chart depicted in FIG. 3 in one embodiment.

In an alternate embodiment, a number of recipients may be grouped, i.e., a group of recipients can always be modeled as a single one at the expense of losing some accuracy in the decisions (e.g., either sender shares with all of them or with none). In this way, applications where the number of recipients is high could be approached with an initial classification stage wherein recipients with similar characteristics are grouped into a single "class". As for the number of fuzziness levels, there exists a trade-off of how much computational overhead can be afforded against how accurately it is desired to approximate the recipient. FIG. 7 illustrates graphically such a trade-off for a domain with one recipient and 10 decision epochs. For instance, if a single recipient is modeled and the maximum amount of time that can be afforded is 500 ms, the best parameterization consists of using 12 levels, resulting in a 5% approximating error.

One consequence of varying the number of decision epochs (in scenarios where this is possible) is that it affects not only performance (more epochs=higher expected reward, as seen in FIG. 4), but also the receiver's optimal strategy. For example, a rational recipient may see increased possibilities of tampering with the watermarks (see FIG. 4 and Table IV, FIG. 11) depending on the number of epochs. In particular, reducing the number of epochs increases the rate at which a recipient may start to leak out information.

FIG. 8 illustrates an exemplary hardware configuration of a computing system 400 running and/or implementing a POMDP solver and the method steps described herein. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with a system, apparatus, or device running an instruction. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Having thus described our invention, what we claim as new, and desire to secure by Letters Patent is:

1. A method for optimally sharing information from a sender to one or more recipients comprising:
    receiving, at a processor device, a parameter information including: identifiers of one or more recipients to receive shared information sent by a sender entity, number of information sharing decision time intervals n where $0 \leq n < N$, and, a reward value for successful sharing and a penalty value for detecting a leakage; and
    building, using said processor device, a model of a dynamic trustworthiness of each said one or more recipients as a Partially Observable-Markov Decision Process (POMPD), said POMPD model including an initial sender belief state of trustworthiness of each of said recipients;
    deriving based on said model, an optimal information sharing policy for sharing information with said one or more recipients that maximizes an expected reward for said sender;
    sharing said information with said one or more recipients, and,
    updating, in each decision time interval n, said belief state of trustworthiness of each recipient in said POMPD model by:
    a) monitoring a communications network, using a leakage detection device, for a leakage of said information shared with the one or more recipients;
    b) observing or not any shared information leakage associated with a recipient;
    c) computing, for the sender, based on the observing, a policy to share the information among the one or more recipients in a subsequent decision time interval; and, d) sharing, according to the policy, said information among the one or more recipients in the subsequent time interval.

2. The method as claimed in claim 1, wherein prior to sharing said information to said one or more recipients, applying a watermark key to an information object to transform said information object to be shared, said leakage detection device including a correlation device to determine if a watermark of a detected leaked information object correlates with the transformed watermarked information object;
determining a degree of correlation against a threshold; and
observing an information object leakage based on said determined degree.

3. The method as claimed in claim 2, wherein said information object comprises a digital media, multi-media, or data file.

4. The method as claimed in claim 2, wherein said POMDP models said sender belief state of trustworthiness for a recipient as a probability distribution.

5. The method as claimed in claim 4, wherein information is shared between a sender and a single deterministic recipient, said POMPD model modeling said single deterministic recipient as leaking information object according to one of: a 0% probability or a 100% probability.

6. The method as claimed in claim 4, wherein information is shared between a sender and a single fuzzy recipient, said POMPD models said single fuzzy recipient as having an f % probability level of leaking information object in a time interval, wherein 0%<f%<100%, said sender maintaining a probability distribution over a finite set of chosen fuzziness levels for said fuzzy recipient, each said levels associated with a probability distribution with which said single fuzzy recipient can leak said packets.

7. The method as claimed in claim 6, wherein said parameter information further including an accuracy of the approximated probability level of said single fuzzy recipient.

8. The method as claimed in claim 4, wherein information is shared between a sender and multiple fuzzy recipients, said POMPD model modeling each said multiple fuzzy recipients as having an f % probability level of leaking information object in a time interval, wherein 0%<f%<100%, said sender maintaining a probability distribution over a finite amount of chosen fuzziness levels for each of said multiple recipients, each said levels associated with a probability with which said fuzzy recipient can leak said packets.

9. The method as claimed in claim 8, wherein said parameter information further including an accuracy of the approximated probability level of each said multiple recipients.

10. The method as claimed in claim 4, further comprising: grouping a number of recipients and modeling said group as a single recipient in said POMDP model.

11. The method as claimed in claim 2, further comprising: corrupting, by a recipient, a portion of a watermark applied to said shared information object, said removal performed according to a recipient strategy devised to alter a sender observing an information object leakage; and,
leaking, by a recipient, said shared information object with said corrupted watermark.

12. A computer system for optimally sharing information from a sender to one or more recipients comprising:
a memory;
a processor device in communications with the memory, wherein the system performs a method comprising:
receiving, at the processor device, a parameter information including: identifiers of one or more recipients to receive shared information sent by a sender entity, number of information sharing decision time intervals n where 0≤n<N, and, a reward value for successful sharing and a penalty value for detecting a leakage; and
building, using said processor device, a model of a dynamic trustworthiness of each said one or more recipients as a Partially Observable-Markov Decision Process (POMDP), said POMDP model including an initial sender belief state of trustworthiness of each of said recipients;
deriving based on said model, an optimal information sharing policy for sharing with said one or more recipients that maximizes an expected reward for said sender;
sharing said information with said one or more recipients, and,
updating, in each decision time interval n, said belief state of trustworthiness of each recipient in said POMPD model by:
a) monitoring a communications network, using a leakage detection device, for a leakage of said information shared with the one or more recipients;
b) observing or not any shared information leakage associated with a recipient;
c) computing, for the sender, based on the observing, a policy to share the information among the one or more recipients in a subsequent decision time interval; and,
d) sharing, according to the policy, said information among the one or more recipients in the subsequent time interval.

13. The computer system as claimed in claim 12, wherein prior to sharing said information to said one or more recipients, said method includes:
applying a watermark key to an information object to transform said information object to be shared, said leakage detection device including a correlation device to determine if a watermark of a detected leaked information object correlates with the transformed watermarked information object;
determining a degree of correlation against a threshold; and
observing an information object leakage based on said determined degree.

14. The computer system as claimed in claim 13, wherein said information object comprises a digital media, multi-media, or data file.

15. The computer system as claimed in claim 13, wherein said POMDP models said sender belief state of trustworthiness for a recipient as a probability distribution.

16. The computer system as claimed in claim 15, wherein information is shared between a sender and a single deterministic recipient, said POMDP model modeling said single deterministic recipient as leaking information object according to one of: a 0% probability or a 100% probability.

17. The computer system as claimed in claim 15, wherein information is shared between a sender and a single fuzzy recipient, said POMDP models said single fuzzy recipient as having an f % probability level of leaking information object in a time interval, wherein 0%<f%<100%, said sender maintaining a probability distribution over a finite set of chosen fuzziness levels for said fuzzy recipient, each said levels associated with a probability distribution with which said single fuzzy recipient can leak said packets.

18. The computer system as claimed in claim 17, wherein said parameter information further including an accuracy of the approximation of the probability level of said single fuzzy recipient.

19. The computer system as claimed in claim 15, wherein information is shared between a sender and multiple fuzzy recipients, said POMPD model modeling each said multiple fuzzy recipients as having an f % probability level of leaking information object in a time interval, wherein 0%<f %<100%, said sender maintaining a probability distribution over a finite amount of chosen fuzziness levels for each of said multiple recipients, each said levels associated with a probability with which said fuzzy recipient can leak said packets.

20. The computer system as claimed in claim 14, wherein said method further comprises:
    corrupting, by a recipient, a portion of a watermark applied to said shared information object, said removal performed according to a recipient strategy devised to alter a sender observing an information object leakage; and,
    leaking, by a recipient, said shared information object with said corrupted watermark.

21. A computer program product for optimally sharing information from a sender to one or more recipients, the computer program product comprising:
    a storage medium, wherein said storage medium is not a propagating signal, said storage medium readable by a processing circuit and storing instructions for execution by the processing circuit for performing a method comprising:
    receiving a parameter information including: identifiers of one or more recipients to receive shared information sent by a sender entity, number of information sharing decision time intervals n where 0≤n<N, and, a reward value for successful sharing and a penalty value for detecting a leakage; and
    building a model of a dynamic trustworthiness of each said one or more recipients as a Partially Observable-Markov Decision Process (POMDP), said POMDP model including an initial sender belief state of trustworthiness of each of said recipients;
    deriving based on said model, an optimal information sharing policy for sharing with said one or more recipients that maximizes an expected reward for said sender;
    sharing said information with said one or more recipients, and,
    updating, in each decision time interval n, said belief state of trustworthiness of each recipient in said POMDP model by:
    a) monitoring a communications network, using a leakage detection device, for a leakage of said information shared with the one or more recipients;
    b) observing or not any shared information leakage associated with a recipient;
    c) computing, for the sender, based on the observing, a policy to share the information among the one or more recipients in a subsequent decision time interval; and,
    d) sharing, according to the policy, said information among the one or more recipients in the subsequent time interval.

22. The computer program product as claimed in claim 21, wherein prior to sharing said information to said one or more recipients, applying a watermark key to an information object to transform said information object to be shared, said leakage detection device including a correlation device to determine if a watermark of a detected leaked information object correlates with the transformed watermarked information object;
    determining a degree of correlation against a threshold; and
    observing an information object leakage based on said determined degree.

23. The computer program product as claimed in claim 22, wherein said POMDP models said sender belief state of trustworthiness for a recipient as a probability distribution.

24. The computer program product as claimed in claim 23, wherein information is shared between a sender and a single deterministic recipient, said POMDP model modeling said single deterministic recipient as leaking information object according to one of: a 0% probability or a 100% probability.

25. The computer program product as claimed in claim 23, wherein information is shared between a sender and a single fuzzy recipient, said POMDP models said single fuzzy recipient as having an f % probability level of leaking information object in a time interval, wherein 0%<f %<100%, said sender maintaining a probability distribution over a finite set of chosen fuzziness levels for said fuzzy recipient, each said levels associated with a probability distribution with which said single fuzzy recipient can leak said packets.

26. The computer program product as claimed in claim 23, wherein information is shared between a sender and multiple fuzzy recipients, said POMDP model modeling each said multiple fuzzy recipients as having an f % probability level of leaking information object in a time interval, wherein 0%<f %<100%, said sender maintaining a probability distribution over a finite amount of chosen fuzziness levels for each of said multiple recipients, each said levels associated with a probability with which said fuzzy recipient can leak said packets.

* * * * *